(12) United States Patent
Porth et al.

(10) Patent No.: US 11,991,944 B2
(45) Date of Patent: May 28, 2024

(54) COMPUTER VISION SYSTEM AND METHOD FOR AGRICULTURE

(71) Applicant: CROP SENTRY LTD., Winnipeg (CA)

(72) Inventors: Christopher Brock Porth, Winnipeg (CA); Lysa M. Porth, Winnipeg (CA); Ehsan Tahmasebian, Winnipeg (CA); Vahab Khoshdel, Winnipeg (CA); Amin Hajihosseinlu, Winnipeg (CA)

(73) Assignee: Crop Sentry Ltd., Winnipeg (CA)

( * ) Notice: Subject to any disclaimer, the term of this patent is extended or adjusted under 35 U.S.C. 154(b) by 403 days.

(21) Appl. No.: 17/306,202

(22) Filed: May 3, 2021

(65) Prior Publication Data

US 2022/0346302 A1 Nov. 3, 2022

(51) Int. Cl.
*A01B 79/00* (2006.01)
*G01C 15/00* (2006.01)
(Continued)

(52) U.S. Cl.
CPC .......... *A01B 79/005* (2013.01); *G01C 15/002* (2013.01); *G01C 15/06* (2013.01);
(Continued)

(58) Field of Classification Search
CPC ............. G06T 7/10; G06T 2207/10028; G06T 2207/30188; G06T 2207/10024; G01S 17/89; G01S 17/88; G01S 17/86; G01C 15/002; G01C 15/06; A01B 79/005; H04N 23/531; Y02A 40/10
See application file for complete search history.

(56) References Cited

U.S. PATENT DOCUMENTS

| 10,113,415 B2 | 10/2018 | Kozak |
| 2004/0032973 A1 | 2/2004 | Robeson et al. |
| 2017/0161560 A1 | 6/2017 | Itzhaky et al. |

FOREIGN PATENT DOCUMENTS

| CA | 2 957 081 | 2/2016 |
| CA | 2 937 571 | 1/2017 |

(Continued)

OTHER PUBLICATIONS

Christiansen et al, Designing and Testing a UAV Mapping System for Agricultural Field Surveying, Sensors, Nov. 23, 2017, pp. 1-19. (Year: 2017).*

(Continued)

*Primary Examiner* — An H Do
(74) *Attorney, Agent, or Firm* — Frost Brown Todd LLP

(57) ABSTRACT

There is provided a computer vision monitoring system and method for use in agriculture. The system has a frame; a battery mounted to the frame and providing electrical power; a Light Detection and Ranging (LiDAR) sensor mounted to the frame; a camera mounted to the frame; an enclosure mounted to the frame, the enclosure housing a processing structure. The processing structure executes instructions such as capturing point data from the LiDAR sensor; capturing image data from the camera; generating a 3D color-assigned cloud point data set from the image data and the point data; and determining crop characteristic data. The method involves similar steps as executed by the processing structure.

21 Claims, 9 Drawing Sheets

(51) Int. Cl.
    *G01C 15/06*     (2006.01)
    *G01S 17/89*     (2020.01)
    *G06T 7/10*     (2017.01)
    *H04N 23/53*     (2023.01)

(52) U.S. Cl.
    CPC ............... *G01S 17/89* (2013.01); *G06T 7/10* (2017.01); *H04N 23/531* (2023.01); *G06T 2207/10024* (2013.01); *G06T 2207/10028* (2013.01); *G06T 2207/30188* (2013.01)

(56) References Cited

FOREIGN PATENT DOCUMENTS

| | | |
|---|---|---|
| CA | 2 937 574 | 1/2017 |
| CA | 2 990 438 | 1/2017 |
| CA | 3 012 124 | 7/2017 |
| CA | 3 030 684 | 1/2018 |
| CA | 3 074 217 | 3/2019 |
| CA | 3 074 937 | 3/2019 |

OTHER PUBLICATIONS

U.S. Appl. No. 17/551,306, filed Dec. 15, 2021.

\* cited by examiner

COMPUTER VISION SYSTEM AND METHOD FOR AGRICULTURE

FIELD

This invention is in the field of a computer vision system and method, and more specifically to a computer vision monitoring system and method for use in agriculture.

BACKGROUND

Farmers and agronomists spend substantial time with "boots on the ground," physically traveling to each field to monitor plant health, disease pressures, etc., which is used to help make precision agriculture decisions. An individual's effective capacity to scan and assess crops is somewhat limited and is not scalable with a repeatable and dependable process.

Canadian Patent No. 3,074,937 to Dagondon et al. discloses methods and systems for controlling a growth environment of a crop. The growth environment comprises a controller unit, one or more control devices, one or more monitoring devices (also referred to as "sensors"), one or more crops, a camera and a light source. The controller unit is connected to the one or more of the control devices, the one or more of the monitoring devices, the camera and/or the light source. The one or more monitoring devices allow sensing one or more environmental factors via a measurement routine of the growth environment. The camera is an image capturing device generating multimedia files such as, but not limited to, a still camera, a red-green-blue camera, a multi-spectral camera, a hyper-spectral camera, a video camera, etc. The camera may be configured to capture images and/or videos of at least a portion of the crop. The resolution is sufficient to allow quantifying a physiological characteristic of the crop.

Canadian Patent No. 2,957,081 to Sauder et al. discloses a method for agronomic and agricultural monitoring includes designating an area for imaging, determining a flight path above the designated area, operating an unmanned aerial vehicle (UAV) along the flight path, acquiring images of the area using a camera system attached to the UAV, and processing the acquired images.

Canadian Patent No. 3,012,124 to Xu et al. discloses a method for determining national crop yields during the growing season comprises receiving agricultural data points for a specific geo-location. Calculating weather index values, which represent crop stress, from the agricultural data records and generates an aggregated weather index data series, where each aggregated weather index data series contains weather index values for a specific weather index. Selecting representative features from the aggregated weather index data series and creating covariate matrices for each geographic area. An agricultural apparatus having one or more remote sensors fixed thereon, which sensors are communicatively coupled either directly or indirectly via agricultural apparatus to the agricultural intelligence computer system and are programmed to send sensor data to agricultural intelligence computer system. Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus.

Canadian Patent No. 2,990,438 to Baurer et al. discloses systems and methods for capturing images of a field and performing agricultural data analysis of the images. The computer system for monitoring field operations includes a database for storing agricultural image data including images of at least one stage of crop development that are captured with at least one of an apparatus and a remote sensor moving through a field. A processing unit executes instructions to analyze the captured images, to determine relevant images that indicate a change in at least one condition of the crop development, and to generate a localized view map layer for viewing the field at the at least one stage of crop development based on at least the relevant captured images. The source of images during any pass could be a remote sensor (e.g., drone with a camera) that is instructed to track (e.g., lead or follow) the apparatus making the field pass. In another example, a user walks through a field and captures images with a mobile device or tablet device having an image capture device (e.g., camera) and the software application. In another example, a user guides an apparatus (e.g., apparatus with wheels and support frame for positioning image capture devices) having at least one image capture device through a field for capturing images. In another example, a self-guided or self-propelled device or robot moves through a field for capturing images with the software application. The software application controls whether images are captured continuously or during time periods of more stable movement as opposed to unstable movement.

Canadian Patent No. 2,937,571 to Miresmailli et al. discloses systems and methods for monitoring and assessing crop health and performance can provide rapid screening of individual plants. Predictive models predict future health of plants in a crop. A source of sensor data is a mobile sensory platform has sensors mounted on a vehicle, cart or drone. The mobile sensory platform is activated to move between the plants and capture data relating to some or all of the plants in the crop. The mobile sensory platform may have a different number of sensors than the handheld devices used by the expert and non-expert in activities.

Canadian Patent No. 3,030,684 to Zhong et al. discloses systems and methods for scalable comparisons between two pixel maps are provided. In an embodiment, an agricultural intelligence computer system generates pixel maps from non-image data by transforming a plurality of values and location values into pixel values and pixel locations. The agricultural intelligence computer system converts each pixel map into a vector of values. The agricultural intelligence computer system also generates a matrix of metric coefficients where each value in the matrix of metric coefficients is computed using a spatial distance between to pixel locations in one of the pixel maps. Using the vectors of values and the matrix of metric coefficients, the agricultural intelligence computer system generates a difference metric identifying a difference between the two pixel maps. The difference metric is normalized so that the difference metric is scalable to pixel maps of different sizes.

Canadian Patent No. 2,937,574 to Miresmailli et al. discloses A multi-sensor device comprises a housing containing multiple sensor modules for capturing and transmitting sensor data for plants in a crop. A control unit within the housing is operable to control the sensor modules, and a communications interface is connected to the control unit for transmitting data from said plurality of sensor modules. The sensor modules can include a physiological sensor, a surface analysis sensor, and chemical sensor. The multi-sensor device can be used as a hand-held device or mounted to a mobile platform for use in an automated crop monitoring system.

Canadian Patent No. 2,990,438 to Baurer et al. discloses systems and methods for capturing images of a field and performing agricultural data analysis of the images. In one embodiment, a computer system for monitoring field operations includes a database for storing agricultural image data including images of at least one stage of crop development that are captured with at least one of an apparatus and a remote sensor moving through a field. The computer includes at least one processing unit that is coupled to the database. The at least one processing unit is configured to execute instructions to analyze the captured images, to determine relevant images that indicate a change in at least one condition of the crop development, and to generate a localized view map layer for viewing the field at the at least one stage of crop development based on at least the relevant captured images.

Canadian Patent No. 3,074,217 to Bedoya et al. discloses a method of real-time disease recognition in a crop field. The method comprises causing a camera to continuously capture surroundings to generate multiple images. The method further comprises causing a display device to continuously display the multiple images as the multiple images are generated. In addition, the method comprises processing each of one or more of the multiple images. The processing comprises identifying at least one of a plurality of diseases and calculating at least one disease score associated with the at least one disease for a particular image; causing the display device to display information regarding the at least one disease and the at least one disease score in association with a currently displayed image; receiving input specifying one or more of the at least one disease; and causing the display device to show additional data regarding the one or more diseases, including a remedial measure for the one or more diseases.

U.S. Pub. No. 2017/0161560 to Itzhaky et al. discloses a system and method for predicting harvest yield. The method includes receiving monitoring data related to at least one crop, wherein the monitoring data includes at least one multimedia content element showing the at least one crop; analyzing, via machine vision, the at least one multimedia content element; extracting, based on the analysis, a plurality of features related to development of the at least one crop; and generating a harvest yield prediction for the at least one crop based on the extracted features and a prediction model, wherein the prediction model is based on a training set including at least one training input and at least one training output, wherein each training output corresponds to a training input.

U.S. Pub. No. 2004/0032973 to Robeson et al. discloses a method for predicting or monitoring the economic value of an agricultural commodity, the method includes the steps of remotely obtaining an image data; analyzing the remote image for a predetermined characteristic; using the analysis to determine a viability of the agricultural commodity; and transmitting the viability data to an interested party.

SUMMARY

As described herein, there is provided a crop monitoring system for a field having a frame; a battery mounted to the frame and providing electrical power; a Light Detection and Ranging (LiDAR) sensor mounted to the frame; a camera mounted to the frame; an enclosure mounted to the frame, and the enclosure housing a processing structure. The processing structure executes a plurality of instructions stored on a tangible computer-readable memory. The processing structure may have a graphical processing unit (GPU). A solar panel may provide electrical charge to the battery.

The instructions may perform one or more of the following: capturing point data from the LiDAR sensor; capturing image data from the camera; generating a 3D color-assigned cloud point data set from the image data and the point data; and determining crop characteristic data.

A rotating platform may be mounted on the frame and may support the LiDAR sensor and the camera; and the instructions may provide for: rotating the rotating platform before the capturing of the point data and the image data.

The instructions may determine a field of view (FOV) of the LiDAR sensor; may determine a rotational measurement associated with the FOV of the LiDAR sensor; and may rotate the rotating platform by the rotational measurement before the capturing of the point data.

The instructions may filter the 3D color-assigned cloud point data set prior to determining the crop characteristic data.

The instructions may filter the point data set prior to generating the 3D color-assigned cloud point data set.

The instructions may segment crop data points from the 3D color-assigned cloud point data set as part of the determining of the crop characteristic data.

The instructions may implement a battery management system placing the processing structure in a standby state when the battery management system determines that the battery falls close to 80% of full capacity.

One or more sensor providing one or more sensor measurement to the processing structure; and the instructions may determine one or more parameter to adjust the crop characteristic data. The one or more sensor is selected from one or more of: a temperature sensor, a humidity sensor, a pressure sensor, a soil moisture sensor, a soil resistance sensor, a nitrogen/phosphorus/potassium (NPK) sensor, a rain gauge, and a solar radiation sensor.

As described herein, there is provided a method for monitoring a field. The method may involve: capturing point data from a Light Detection and Ranging (LiDAR) sensor; capturing image data from a camera; generating, using a processor, a 3D color-assigned cloud point data set from the image data and the point data; and determining, using the processor, crop characteristic data.

The method may rotate a rotating platform supporting the LiDAR sensor and the camera before the capturing of the point data and the image data.

The method may determine a field of view (FOV) of the LiDAR sensor; may determine a rotational measurement associated with the FOV of the LiDAR sensor; and may rotate the rotating platform by the rotational measurement before the capturing of the point data.

The method may filter, by the processor, the 3D color-assigned cloud point data set prior to determining the crop characteristic data. The method may filter, by the processor, the point data set prior to generating the 3D color-assigned cloud point data set. The method may segment, by the processor, crop data points from the 3D color-assigned cloud point data set as part of the determining of the crop characteristic data.

The processor may comprise a graphical processing unit (GPU). The method may place the processor in a standby state when a battery management system determines that the battery falls close to 80% of full capacity.

The method may read one or more sensor measurement from one or more sensor; and may determine one or more parameter from the one or more sensor measurement to adjust the crop characteristic data. The one or more sensor may be selected from one or more of: a temperature sensor, a humidity sensor, a pressure sensor, a soil moisture sensor, a soil resistance sensor, a nitrogen/phosphorus/potassium (NPK) sensor, a rain gauge, and a solar radiation sensor.

DESCRIPTION OF THE DRAWINGS

The figures illustrate various parts of the overall systems and include exemplary hardware, enclosures, systems, subsystems to the invention, which may be constructed in various forms. For a better understanding of the features and capabilities described herein, the figures aim to simplify the illustrations. The application does not claim of this specific embodiment or use of systems which can be reconstructed with various methods. The drawings contained herein represent example aspects and do not limit the scope. For a detailed description, reference will now be made to the accompanying illustrative drawings in which:

DETAILED DESCRIPTION

Figure 1:
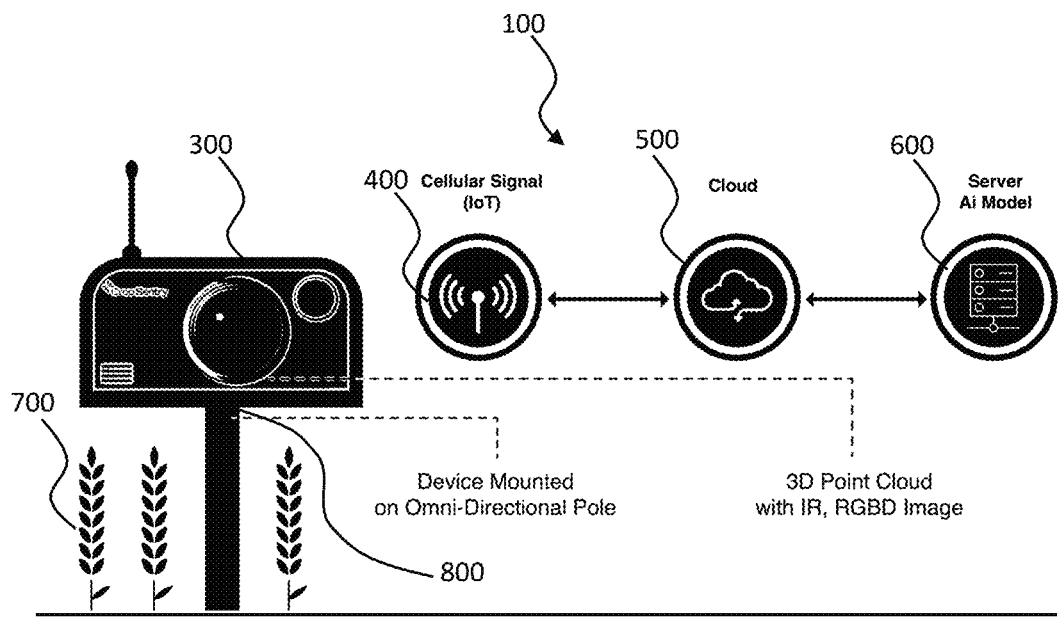
FIG. 1 is a high level diagram of a field monitoring system.

The agriculture sector is facing tremendous challenges in feeding the worlds growing population, and simultaneously responding to the risks posed by climate change. The decisions that individual producers make on their farms are important to maximizing productivity and achieving sustainable agriculture, and precision agriculture and other best management practices (BMPs) play an important role in sustainable intensification. As described herein, measurement and optimization of crop yields and the use of inputs may be achieved.

The techniques as described herein may improve at least one of: crop health monitoring, pest monitoring, plant protein management, crop phenotyping, and/or more broadly decision support systems and/or insurance.

Phenological development of a crop may be complex and may be determined based on daily field events, such as temperature, precipitation, soil moisture, solar radiation, etc., in combination with one or more farm management decisions, which may be mapped to one or more daily observations of crop development using the techniques described herein.

The machine learning (ML) and field monitoring systems and methods may provide data intensive science in a multidisciplinary, agri-technologies domain. However, a challenge in developing ML-based system and methods for crop phenological modeling may be a lack of accurate, non-destructive methods that measure one or more biophysical responses of the crop throughout the growing season rather than only at harvest.

The monitoring systems and method described herein demonstrate an AI-driven device and software platform for real-time (24-7), autonomous, and/or non-destructive crop monitoring. The techniques herein may provide real-time visual monitoring leading to quantitative data and absolute crop monitoring, protein management, decision support, and/or insurance applications, and may overcome technological hurdles pertaining to cost, scale/range, image quality, computational intensity, autonomous data collection, and archiving, and seamless interoperability.

The techniques herein may lead to increased productivity and/or reduced negative externalities from crop production while reducing GHG emissions. Through better field monitoring may lead to higher economic returns, while also reducing environmental risk. The techniques herein may provide a source of precision agriculture (PA) data important for developing in-season artificial intelligence-based decision making models. These techniques may increase a return-on-investment of PA-based technologies leading to higher adoption across farms and thus increased economic returns and more sustainable farming practices.

In Canada, approximately 10% of GHG emissions are from crop and livestock production. The main gases emitted by crop production activities include carbon dioxide ($CO_2$) and nitrous oxide ($N_2O$), where $N_2O$ is 300 times stronger climate gas than $CO_2$. The techniques described herein may provide advantages for Beneficial Management Practices (BMPs) in order to reduce or eliminates one or more environmental risks. In particular, the BMPs may optimize one or more of pesticide handling, energy efficiency, and water quality. In addition, the BMPs may take into consideration legislation, practicality, and operational needs for a specific operation. BMPs that optimize nitrogen use can have a significant impact on GHG emission reductions (where $N_2O$ results from having excess fertilizer in the field, which are not absorbed from the plants during the cycle). Research shows that PA technologies, such as using Variable Rate Technology (VRT), which may allow one or more of: fertiliser, chemicals, lime, gypsum, irrigation water, and/or other farm inputs to be applied at different rates across a field, without manually changing rate settings on equipment or having to make multiple passes over an area, may significantly reduce emissions by applying an optimized amount of fertilizer, at a right place and/or time, to meet crop demands, avoiding excess amounts leftover (4R stewardship).

The technology herein may provide real-time crop phenological response data throughout the growing season to build informed decision support algorithms. The technology may generate 3D point cloud data where each point may be defined by coordinates in space, which may then be rendered as a mesh to create a highly accurate 3D model. The 3D point cloud may provide biomass classification, phenological structure segmentation, and/or biophysical parameter quantification. The point clouds may handle large datasets and provide a high-throughput and high-density method of collecting data and may penetrate and collect measurements from within a crop canopy.

Turning to FIG. 1, a high-level diagram of a field monitoring system 100 is shown. The field monitoring system 100 may comprise a field monitor 300, described in further detail with reference to FIG. 3 below, that may communicate over a wireless communication platform 400 to a cloud storage 500. The communication platform 400 may be using an LTE/4G network and/or using a satellite communication channel. In some aspects, the wireless communication platform 400 may be replaced with or used in addition to a radio telemetry. In some aspects, the field monitor 300 may store field data until the communication platform 400 comes into range of the field monitor 300.

The field monitor 300 may perform one or more measurements of plants 700 in a field and may provide field data to the cloud storage 500. A server artificial intelligence model 600 may process the field data provided to the cloud storage 500 from the field monitor 300. Other aspects may store the field data within memory of the controller 319, such as on an SD and/or a microSD® memory card or other type of long-term tangible computer-readable medium, to be retrieved for analysis.

Although the field monitoring system 100 shown in FIG. 1 demonstrates only a single field monitor 300, other aspects may comprise many field monitoring systems 300. Each of the field monitors 300 may be identical in function as described herein. In other aspects, the field monitors 300 may have one or more different functions from at least one other field monitors. As shown in FIG. 1, the field monitor 300 may be rotatably mounted on an omni-directional pole 800. In some aspects, the field monitor 300 may be mounted by way of the omnidirectional pole 800 to a stationary position or a mobile position, such as to a tractor, all-terrain vehicle (ATV), etc.

Figure 2:
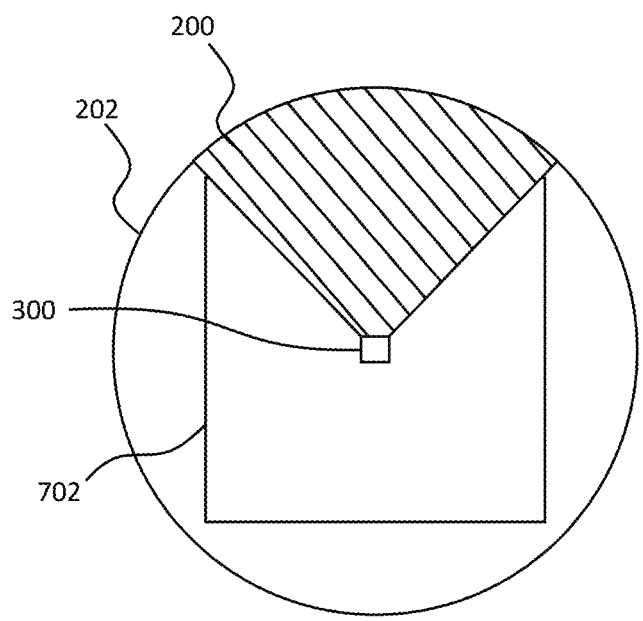
FIG. 2 is a top view demonstrating a field of view (FOV) of the computer vision system.

Turning to FIG. 2, a top view of a field of view 200 of the field monitor 300. The field monitor 300 may rotate on the omni-directional pole 800 and may observe an area and/or volume encompassed by a circle 202 (or in the case of volume, a cylinder). In this aspect, the circle 202 completely encompasses a field 702 that may measure approximately 805-m by 805-m. The field monitor 300 may cover a relatively large range of crops within a field having a scanning approximately 500-m radially (e.g., approximately 785,398-m$^2$). In an aspect, a fixed field monitor 300 in the center of four ¼ sections, and rotated, may cover a relatively large area with one sensor whereas a mobile field monitor 300 may provide less frequent but larger area coverage.

Figure 3:
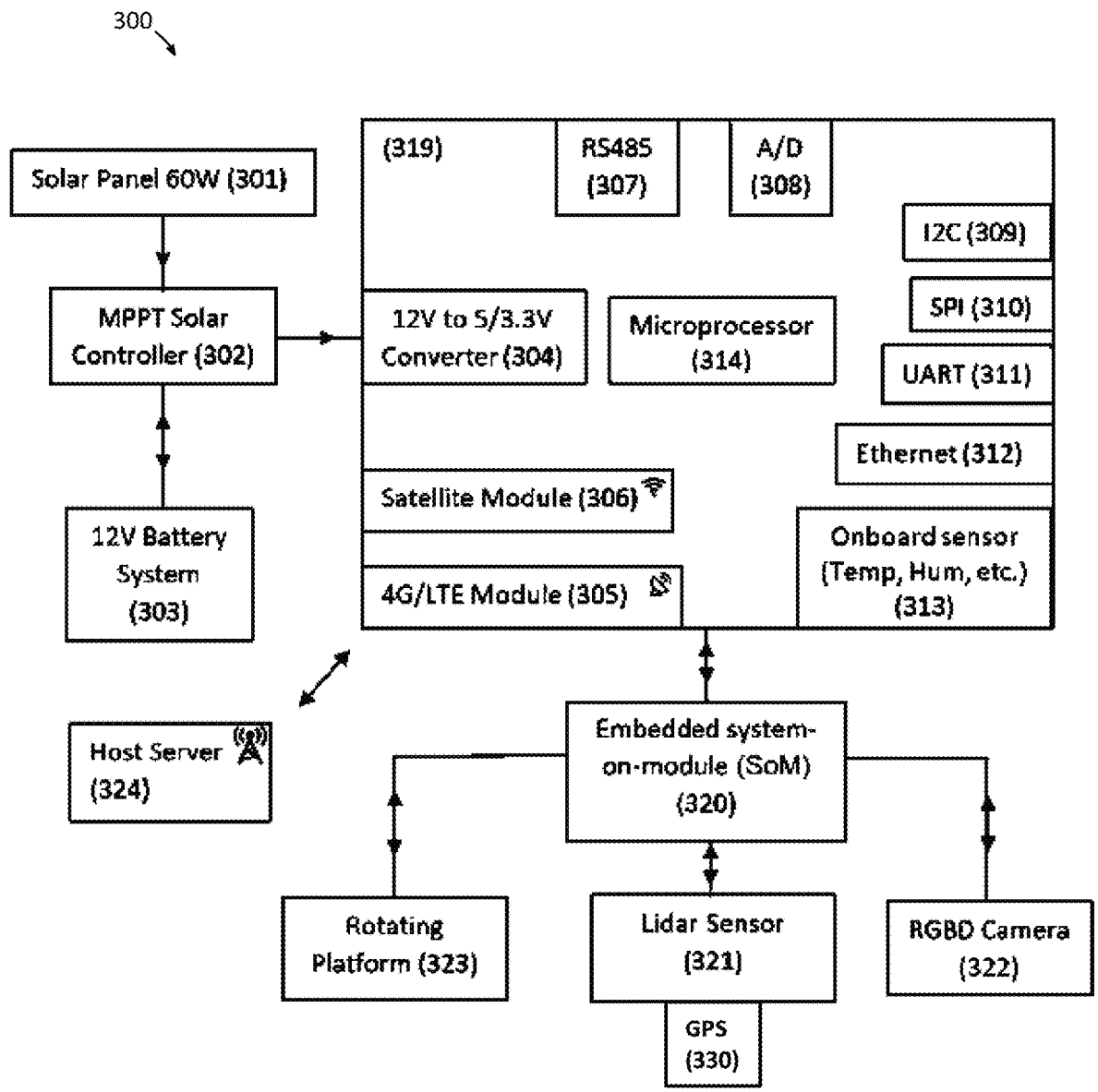
FIG. 3 is a block diagram of the computer vision system.

One or more components of the field monitoring system 300 is shown in FIG. 3. The field monitor 300 may be powered by a solar panel 301 supplying power to a battery 303 in order to keep the battery 303 charged. In this aspect, the solar panel 301 may be rated to 50-Watts, although other aspects may have a higher or lower wattage dependent on the power requirements, and/or the battery 303 may be a 12-Volt battery 303. In this aspect, the battery 303 is a lead-acid battery that may have an operational range from −40° C. to +50° C. The battery 303 may have a shelf life @ 25° C. of 2 years and a float life @ 2.27-V per cell of 10 years @ 25° C. The cycle life of the battery 303 may be 400 to 80% depth of discharge (DOD).

A maximum power point tracker (MPPT) 302 may adjust a voltage of the solar panel 301 to absorb a maximum power in various lighting conditions. A high-efficiency voltage converter 304 may step down the 12-V battery 303 to 5-V and/or 3.3-V for a controller 319 and/or associated circuitry.

A battery management system (BMS) may comprise one or more instructions executing on the microprocessor 314. The instructions may ensure that a charge/discharge cycle of the battery 303 precisely follows the technical specification to maximize the life of the battery 303. The BMS may keep a state of charge (SOC) of the battery 303 to above 80% at all times in order to maximize a lifetime of the battery 303. The BMS may be capable of waking up the field monitor 300 to complete a measurement and going into a sleep mode. While in sleep mode, the field monitor 300 may use less than 50-mA of current to conserve a lifetime of the battery 303. The BMS may comprise instructions to suspend performing the measurement if the BMS anticipates that the battery 303 may fall below 80% of full capacity of the battery 303. A lower than 80% of full capacity of the battery 303 may only rarely be experienced, such as a prolonged period of cloudy weather and/or a defective or covered solar panel 301. In such instances, the BMS may execute instructions to send a notification via the cellular module 305. The lifetime of the battery 303 may depends on many factors including a depth of discharge (DOD), and a number of discharge/charge cycles which is controlled by the BMS. The BMS may also maximize the lifetime of the battery 303 based on a precise charging/discharging algorithm specific to a battery type. The BMS may allow the battery 303 to last longer than five or ten years. The BMS may also monitor a state of health (SOH) of the battery 303 and may report the state of health periodically to a host server 324. The state of health may permit a user to replace the battery 303 before an end of the lifetime to permit a continuous operation of the field monitor 300.

In general, if the battery 303 is to be discharged frequently, a cycle life rather than a calendar life may be more relevant. Conversely, if the battery 303 is to be used primarily as power backup, the calendar life of the battery 303 should be considered. The BMS may comprise instructions to execute an optimization to have a maximum calendar life while still cycling once a day with a minimum DOD. In order to determine the battery 303 is cycling or on standby (float), then the following criteria may be considered by the BMS. If a minimum time between two discharges is not less than fourteen days, the battery 303 may be considered on standby. In order to maintain the battery 303 on standby during a measurement cycle, the BMS may initiate the measurement cycle to correspond to when the solar panel 301 may be providing a near maximum amount of energy. The measurement cycle during the maximum solar radiation time period may also be advantageous to the image measurements as a maximum illumination may be provided.

The field monitor 300 may perform two measurements per day for approximately 6 months in a year. A single measurement may take approximately 6 minutes per measurement cycle. This measurement pattern may result in 365 battery cycles per year with less than 10% DOD. The field monitor 300 may use approximately 30-W of power during each 6 minute measurement and therefore would consume 3-Wh or 2% of a total capacity of the battery 303.

The controller 319 may comprise a processor 314 and an associated tangible computer-readable memory (not shown) storing one or more instructions to execute one or more routines, such as a self-diagnostic or a power-up routine, as described herein in further detail below. The controller 319 may provide one or more communication interfaces. In this aspect, the communication interfaces may comprise a cellular module 305 (e.g., 4G/LTE transceiver), a satellite transceiver module 306, and/or an ethernet transceiver module 312 for communication with a host server 324. One or more sensor interfaces may comprise one or more RS485 interfaces 307, one or more analog-to-digital converter (ADC) 308, one or more Inter-Integrated Circuit (I2C)

interfaces 309, one or more serial peripheral interfaces (SPI) 310, and/or one or more Universal Asynchronous Receiver-Transmitter (UART) interfaces 311. These sensor interfaces may be configured to interface with one or more industrial and/or agricultural sensors external to the controller 319. In this aspect, the microprocessor 314 may communicate with up to 32-sensors with a cable length of 800-meters over the RS485 interface 307 using a Modbus protocol.

The controller 319 may comprise a number of onboard sensors 313, such as a temperature sensor, a humidity sensor, a pressure sensor, a soil moisture sensor, a soil resistance sensor, a nitrogen/phosphorus/potassium (NPK) sensor, a rain gauge, and/or solar radiation sensors, etc. Each sensor may have one or more interfaces in order to communicate with the microprocessor 314, such as the SPI 310, the I2C 309, Modbus, and/or a direct interface. The type of sensor 313 may vary according to one or more crop characteristics and/or an impact of that data on a yield prediction model described in further detail below. The controller 319 may be capable of two-way communication with the sensors 313 and the sensors 313 may determine parameters such as a leaf thickness, a leaf wetness, a wind speed, a wind direction, a temperature, a pressure, a humidity, a solar radiation, a soil moisture, and/or a soil chemistry. A sampling interval for each of the sensors 313 may be adjusted automatically or manually as required. The sampling interval may depend on a sensor type and a rate of change expected in the measurement data. The microprocessor 314 may automatically adjust the sampling interval to ensure an accuracy of continuously measured data while addressing memory storage available on the controller 319. For example, for a temperature measurement, the sampling interval of every twenty to sixty seconds may be sufficient. In another example for a pressure measurement, a faster sampling interval may be more appropriate.

The microprocessor 314 may execute a data transfer routine from the memory. When the data transfer routine is executed, the cellular module 305 may transfer an amount of data to the host server 324. If the cellular module 305 reports a weak and/or no cellular signal, then the data transfer routine may then transfer the amount of data over the satellite module 306. The cellular module 305 may communicate using any method of cellular transmission, such as text message, email, pager alert, SMS (short message service), MMS (multimedia message service), etc. The data transfer routine may also receive one or more commands from the host server 324 to make a decision and/or change of settings.

The microprocessor 314 may execute a self-diagnostic routine every time that the controller 319 initializes to take a measurement from the sensors 313. The self-diagnostic routine may monitor a battery health and/or may review a raw data collection routine to determine one or more abnormal and/or unexpected readings. If an abnormal state is determined, the self-diagnostic routine may send an alert via the data transfer routine. In this aspect, the alert may comprise a brief description of the abnormal state. In another aspect, the self-diagnostic routine may reinitialize the controller 319 using an initialization routine.

The controller 319 may interface with a graphical processing unit (GPU) 320. The controller 319 and the GPU 320 may collectively be referred to as a processing structure. In this aspect, the GPU 320 comprises an embedded system-on-module (SoM). The GPU 320 may execute instructions for one or more machine learning routines, one or more artificial intelligence (AI) routines, and/or one or more data processing routines for crop data. The controller 319 may request data processing from the GPU 320 for one or more of the sensors 313. In particular, the controller may request data processing from the GPU 320 for one or more sensors 313 that have a high-resolution and/or a high sampling rate. In some aspects, the microprocessor 314 and the GPU 320 may be the same processor in the processing structure.

In this aspect, the GPU 320 may receive point data directly from a Light Detection and Ranging (LiDAR) sensor 321 via a Gigabit Ethernet (GigE) interface using IEEE 1588-2008 for data synchronization. The GPU 320 may also communicate with the controller 319 via the Ethernet interface 312. The LiDAR sensor 321 may be an ultra-high point cloud precision and density sensor that may feature an angular precision of 0.03-degrees and/or a beam-divergence angle of 0.12-degrees in a vertical direction and 0.02-degrees in a horizontal direction. The LiDAR sensor 321 may sample point data at approximately 40 megabytes (MB) of data every 10 seconds (e.g. approximately 33.5 Mbps), at a resolution of approximately 2-cm, up to a distance of 500-m radially per LiDAR sensor 321. The LiDAR sensor 321 may be IP67 rated (e.g., a dust protected rating of 6 and a water immersion rating of 7). The LiDAR sensor 321 may integrate with a network hub (not shown) to generate georeferenced 3D point cloud data. Multiple LiDAR sensors 321 may be connected to the same network hub (not shown) in order for the GPU 320 to integrate all or most of point data into a combined output. In this aspect, the LiDAR sensor 321 may also comprise a GPS sensor 330 in order to provide one or more GPS coordinates to the controller 319. Other aspects may have the GPS measurements provided by the GPS sensor 330 located in the cellular module 305 and/or satellite modules 306. In other aspects, an independent GPS sensor 330 may be present on the controller 319.

Similarly, the GPU 320 may receive sensor data directly from a colour/depth (RGBD) camera 322. The RGBD camera 322 may be an enhanced vision-based camera that assigns image data to a cloud of point data. The camera 322 may interface with GPU 320 via the Gigabit Ethernet (GigE) and/or USB. The GPU 320 may perform a data fusion process on the image data the camera 322 and the point data from the LiDAR sensors 321 to generate a 3D-color-assigned cloud point data set.

As may be appreciated, the high-throughput 3D scanning may be extremely computationally intensive and may provide sampling of approximately 200,000 points, or more, per second. By providing the GPU 320 executing machine learning processing and/or compression on the field monitor 300, the resultant data may be more efficiently transferred to the cloud storage 500.

Figure 9A:
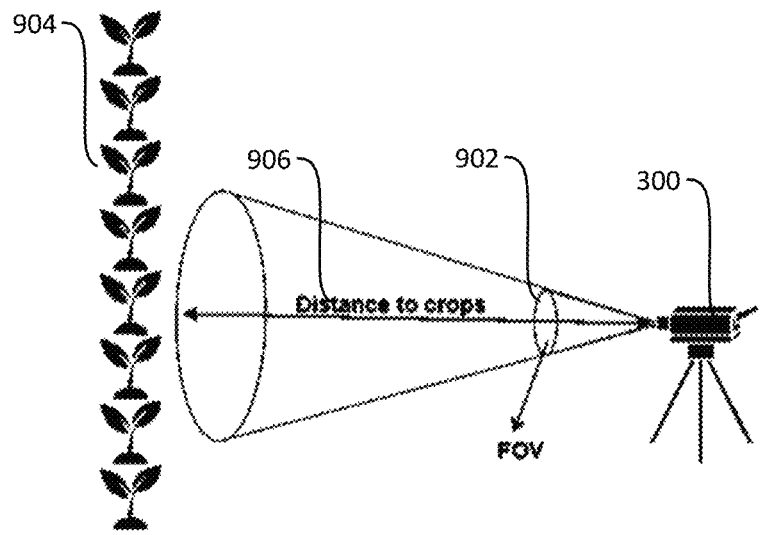
FIG. 9A is a side perspective view of a rotating platform for the computer vision system.
Figure 9B:
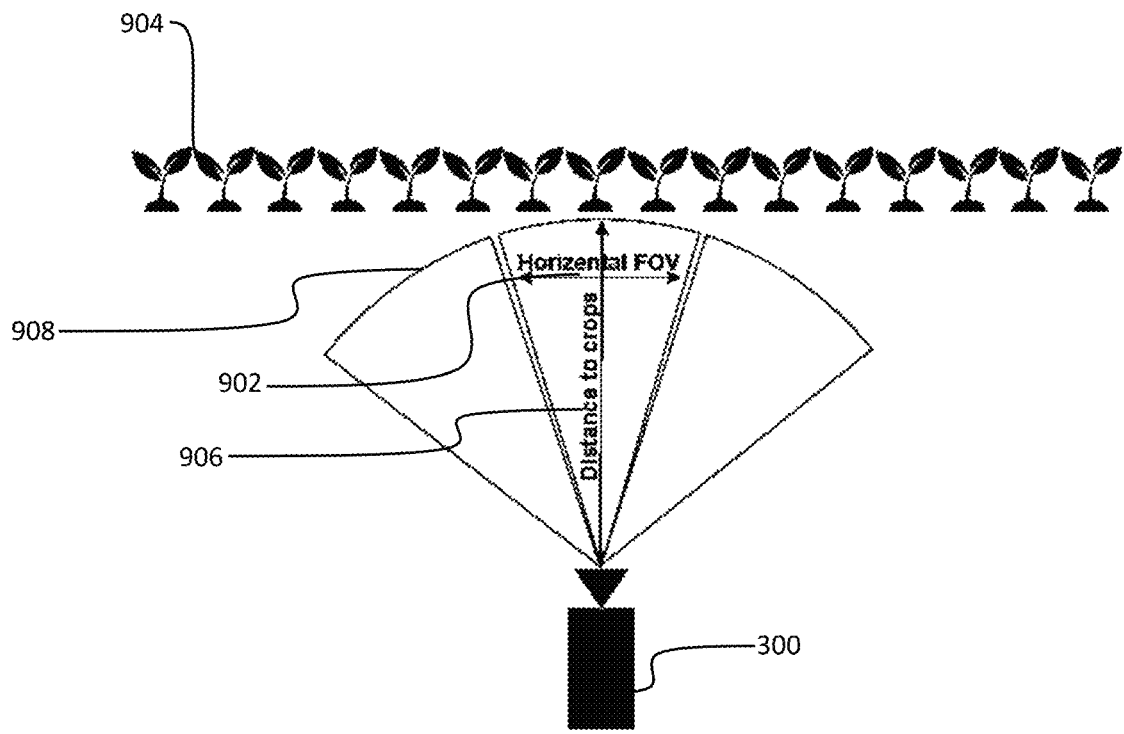
FIG. 9B is a top view of a rotating platform for the computer vision system.

Turning to FIG. 9A and FIG. 9B, a field-of-view (FOV) 902 of the LiDAR sensor 321 and a field of view (FOV) 908 of the RGBD camera 322 is shown. Both of the FOVs 902, 908 generally define a cone extending a distance 906 towards the crop plants 904. The FOV 902 of the LiDAR sensor 321 and the FOV 908 of the camera 322 may aligned horizontally in some aspects. In other aspects, a transformation between the LiDAR FOV 902 and the camera FOV 908 may be calibrated. As may be seen particularly in FIG. 9B, the FOV 908 of the camera 322 is wider than for the LiDAR sensor 321. In this aspect, the FOV 902 of the LiDAR sensor 321 may be approximately 14.5-degrees horizontal and the FOV 908 of the camera 322 may be approximately 90-degrees. In some aspects, a set of multiple LiDAR sensors 321 may be used to provide a wider FOV 902. When a single LiDAR sensor 321 is used, a number of scans may be determined by the horizontal FOV 902 and the distance 906 to the crop plants 904. In some aspects, the GPU 320 may detect a type of the LiDAR sensor 321 to determine the FOV 902 and calculate a number of scans necessary to provide a desired resolution for the 3D point cloud. In this aspect, a complete 360-degree measurement may take approximately 300-seconds based on the LiDAR 321 having a FOV of 15-degrees, which requires approximately 25 scans from the LiDAR 321. A recording time for each scan is approximately 3-seconds. In other aspects, the LiDAR 321 may have a lower resolution and a larger FOV of 40-degrees resulting in a faster 360-degree measurement of 120-seconds as only 10 scans from the LiDAR 321 may be required. The selection of a resolution of the LiDAR 321 may be based on a crop type. For example, a lower resolution LiDAR 321 may be sufficient resolution to perform measurement of crops with larger individual plants, such as corn.

The GPU 320 may control a rotating platform 323 for performing the scans. Other aspects may have the controller 319 control the rotating platform 323. The rotating platform 323 may be a servo-based IP67 rotating platform that rotates the LiDAR sensor 321 and/or the camera 322 through an angle of 360-degrees as previously shown in FIG. 2. The GPU 320 may control at least one low electric motor to effect a rotation of the rotating platform 323.

After the GPU 320 determines the number of scans, then the GPU 320 may send a signal to the servo motor to rotate the platform 323 by a rotational measurement (e.g. M=360/(number of scans)±margin error (precision of the servo motor)) and then start the capturing process. When a first capture process is finished, the servo motor may move the platform 323 by M-degrees and perform a subsequent capture. This process may continue until the number of scans has been performed. In some aspects, if the GPU 320 determines that a scan is blocked by a tall plant, the GPU may instruct the servo motor of the platform 323 to increase a height of the platform.

Although this aspect describes discrete scans around the 360-degrees, other aspects may have the platform 323 rotate continuously while capturing measurements and/or image data. As noted, processing data captured in this manner may be more complex and may require more storage and/or processing power.

In this aspect, the GPU 320 may perform the complete 360-degree measurement before processing the measurement and/or image data. The measurement and/or image data may be stored and/or cached to memory of the GPU 320, the controller 319, and/or a memory card, such as an SD or microSD® card. Following the 360-degree measurement, the GPU 320 may start processing the measurement and/or image data. Adjacent images from the camera 322 may be registered and/or stitched together in order to provide a complete 360-degreee image.

When the camera 322 and LiDAR sensor 321 are used in combination, a FOV limit for the scanning process may be determined by the LiDAR sensor 321. Since FOV 908 of the camera may be larger than LiDAR sensor 321, a portion of image data from the camera 322 may be used to assign color to the 3D point cloud data generated by LiDAR sensors 321 that may be determined based, in part, on an RGB region of the image data and/or an associated distance from the LiDAR sensor 321.

The 3D colour assigned cloud point data set may then be processed by one or more data cleaning processes executing on the GPU 320. The data cleaning processes may filter out noise and/or outliers from the 3D-color-assigned cloud point data set in order for the data to be used by one or more deep learning processes are described in further detail below. The cleaned data points may be stored locally on a local storage device (e.g., hard drive, solid state drive, etc.). In other aspects, the cleaned data may be transmitted to the host server 324 via either the satellite module 306 and/or the cellular module 305.

The field monitor 300 may also comprise an inexpensive video or camera (not shown) in order to allow streaming of local images and/or video.

In some aspects, the controller 319 may also comprise control of one or more valves (not shown) for irrigation.

Figures 4A, 4B:
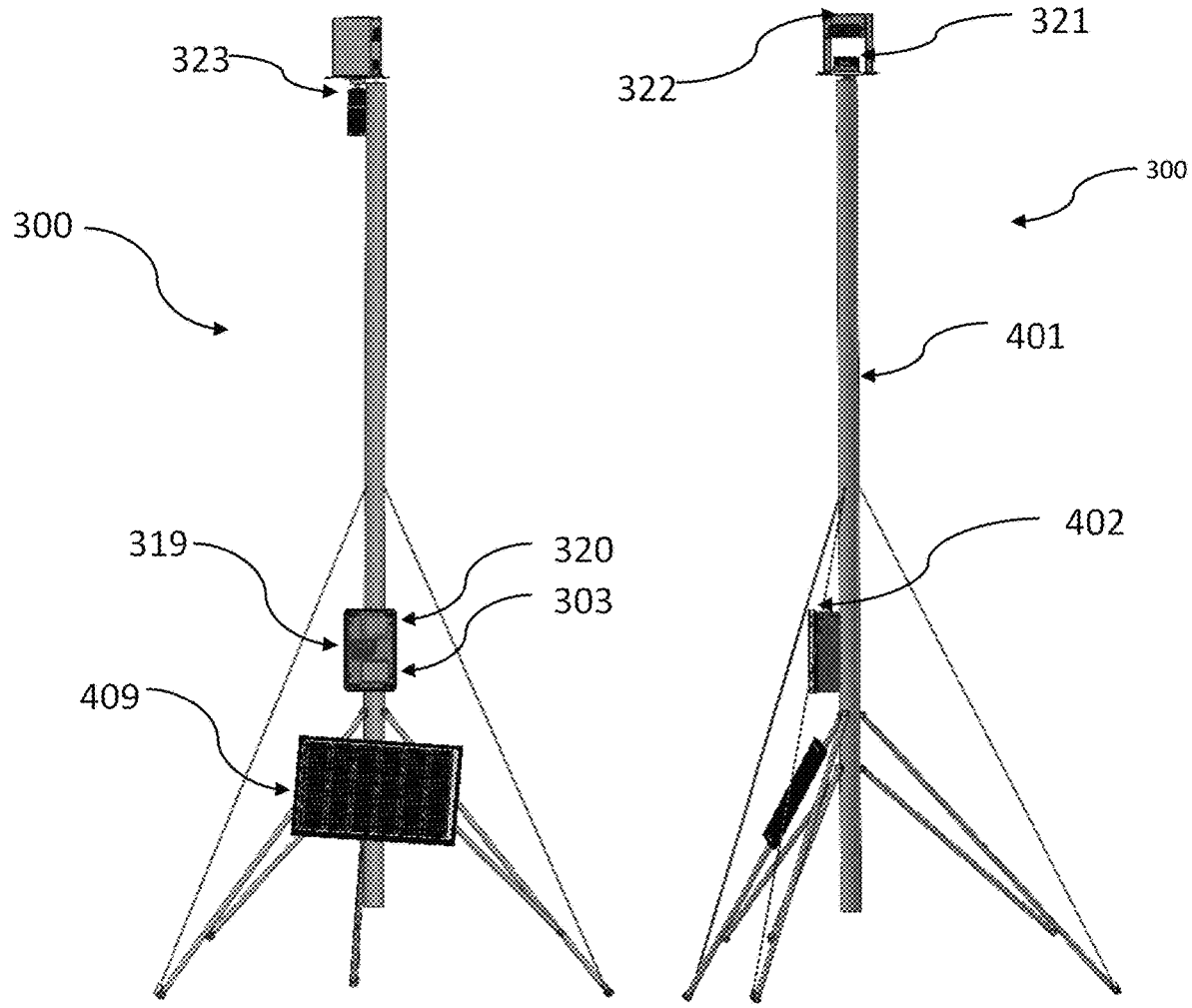
FIG. 4A is a rear perspective view of a mechanical mounting system.
FIG. 4B is a front perspective view of the mechanical mounting system.

Turning to FIG. 4A and FIG. 4B, an example of the field monitor 300 is shown. The field monitor 300 may be mounted on a frame, such as an adjustable tripod 401, made of a galvanized steel tubing. The tripod 401 may be a permanent and/or a temporary installation. The tripod 401 may comprise a lightning and/or grounding rods and grounding cables (not shown). The tripod 401 may be capable of a vertical load of up to 200-kg (440-lbs). In this aspect, a 50-Watt solar panel 409 may be installed with an adjustable mounting angle using a universally adjustable mounting bracket. The solar panel 409 may have a lifespan of 25 years and an efficiency loss of 5% per 5 years. The electronic components of the field monitor 300, such as the MPPT solar controller 302, a lead acid battery 303, the GPU 320, controller 319, 405, may be housed within an IP67 enclosure 402. The LiDAR sensor 321 and the RGBD camera 322 may be mounted on the rotating platform 323.

Figure 5:
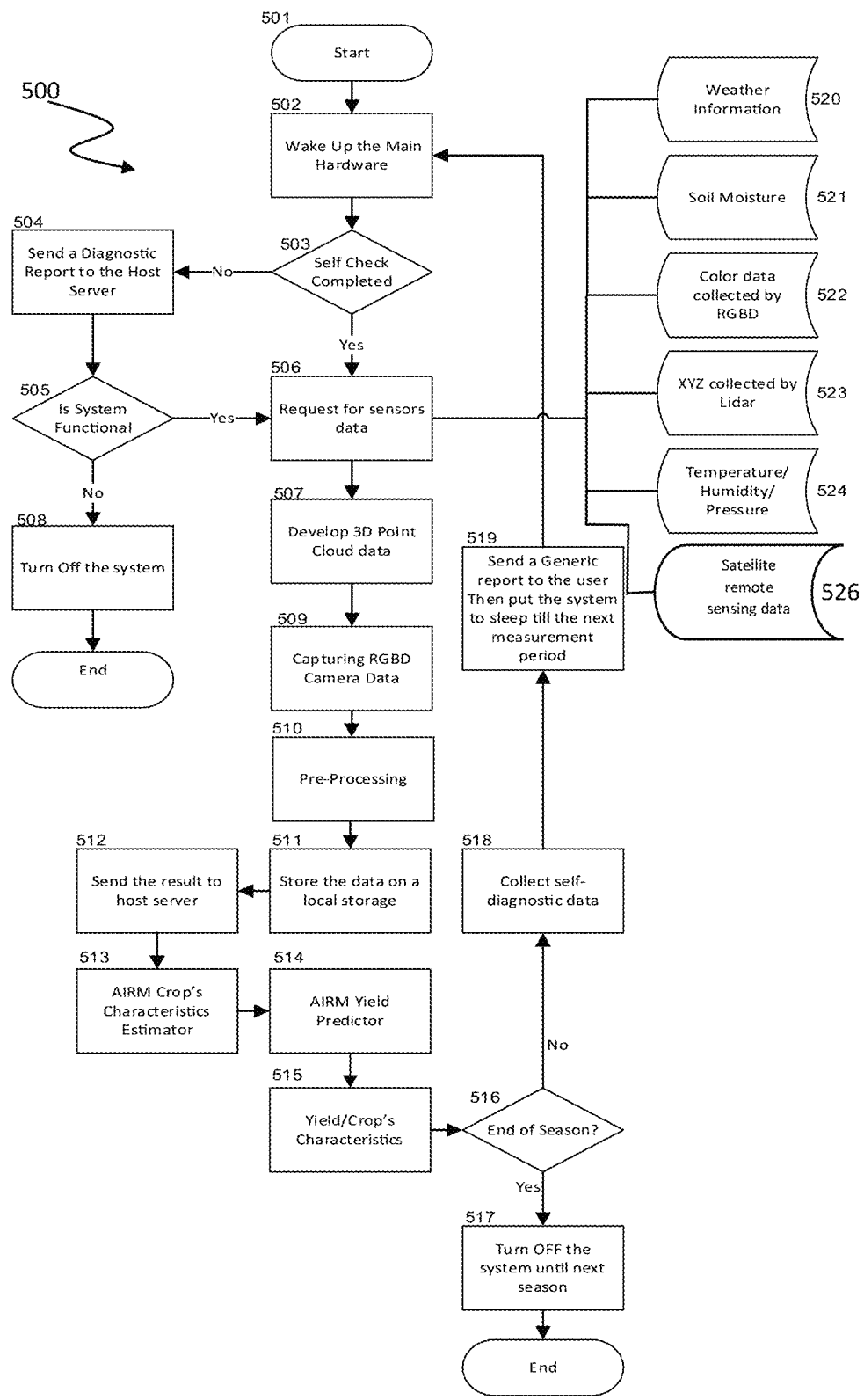
FIG. 5 is a flowchart of a method of an autonomous crop monitoring process.

FIG. 5 depicts a flow diagram for the autonomous crop monitoring process 500. The process starts 501 with initiating an initialization process 502 to wake up the controller 319. After the controller 319 is ready, the controller 319 performs a self-check process 503 to ensure all components 300 are functional and the controller 319 is ready for operation. If the self-check process 503 is not completed, a diagnostic report process 504 may send a diagnostic report to the host server 324 and may wait for one or more corrective commands coming from the server 324 to ratify one or more errors. A functionality test 505 may then either return to a request for sensor data process 506. If the functionality test 505 fails then the controller 319 may execute a termination process 508 where the field monitor 300 may be enter a shutdown and/or be restarted.

The request for sensor data process 506 may then initialize one or more sensors 313 in order to retrieve sensor data. In this aspect, the request for sensor data process may initialize at least one of: a weather sensor 520, a soil moisture sensor 521, colour data 522 collected by the RGBD camera 322, point cloud data 523 collected by the LiDAR 321, and/or temperature/humidity/pressure data 524.

The point cloud data 523 may be used by the 3D point cloud pre-process 507 to develop the 3D point cloud data in space where each point in the point cloud data 523 comprises a set of X, Y, Z coordinates. The captured RGBD camera data 522 may be retrieved by a capture process 509. During processes 507 and 510, noise and/or outliers may be removed to prepare the data for a registration process 510. The pre-process 507 may also consider points associated with the ground to be outliers and/or noise. The registration process 510 may then assign the captured color data 522 to each point of the 3D point cloud data 523.

The filtered point cloud data may then be stored using a storage process 511. A transmission process 512 may send the field data to the host server 324.

Figure 6:
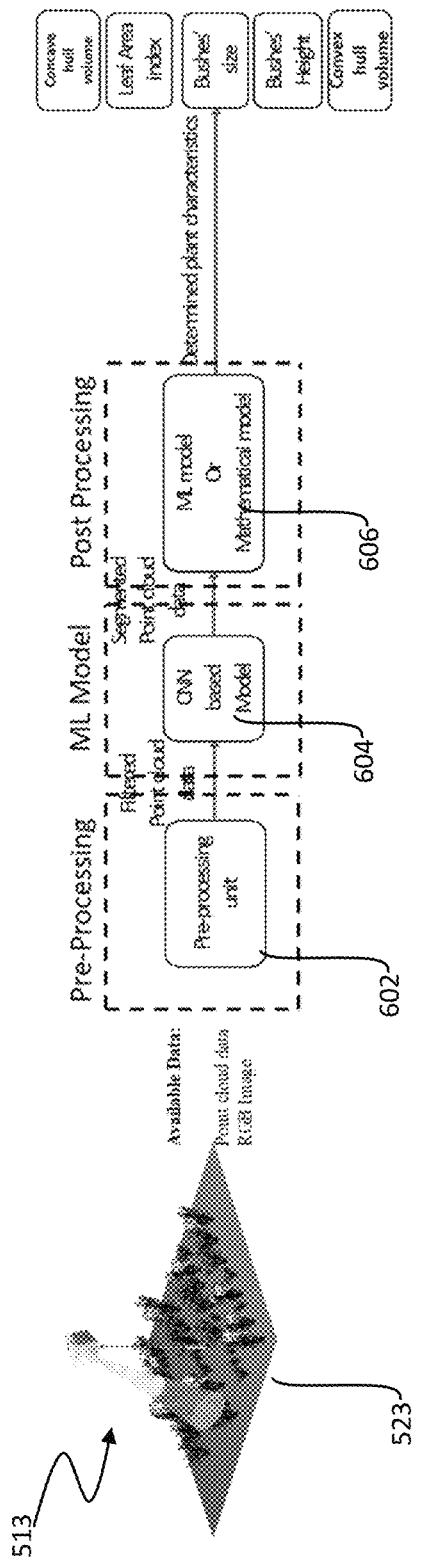
FIG. 6 shows a block diagram of stages of a machine learning process.

A characteristic estimator 513 may comprise a machine learning model 513 that may retrieve the colour registered point cloud data. In reference to FIGS. 6 and 7, the crop characteristic estimator 513 may include three main stages of a pre-processing stage 602, a deep learning (ML) model stage 604, and a post-processing stage 606. During the pre-processing stage 602, one or more statistical methods may be used to remove noise and/or unwanted data (e.g., the ground), such as outliers, from the 3D point cloud data 523 to form a noise processed point cloud data 702 for the deep learning model 604. The preprocessing stage 602 may determine one or more rows of crop plants in order to assist in determining outliers and/or noise.

Figure 7:
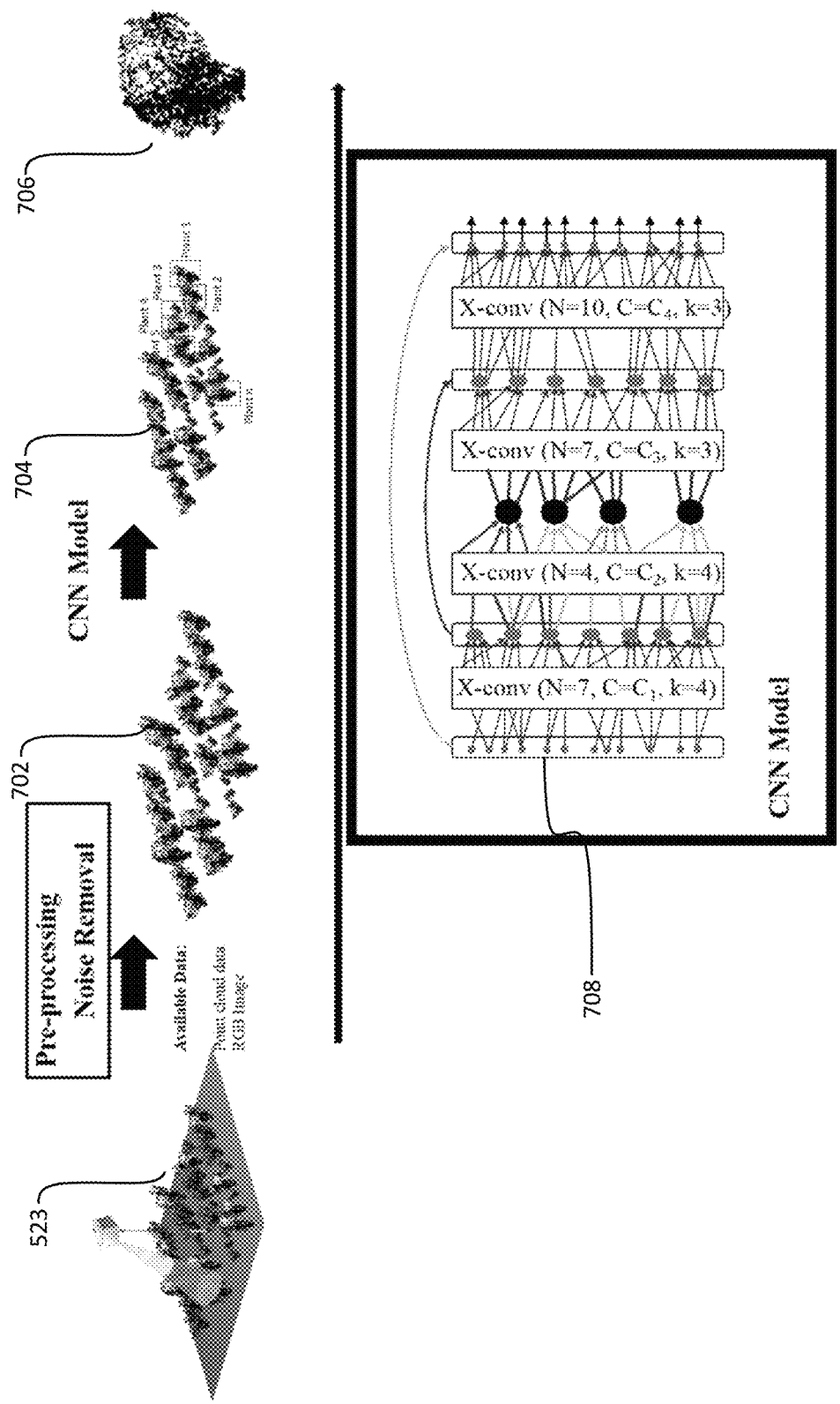
FIG. 7 illustrates a deep learning model for segmentation of point cloud data.
Figure 8:
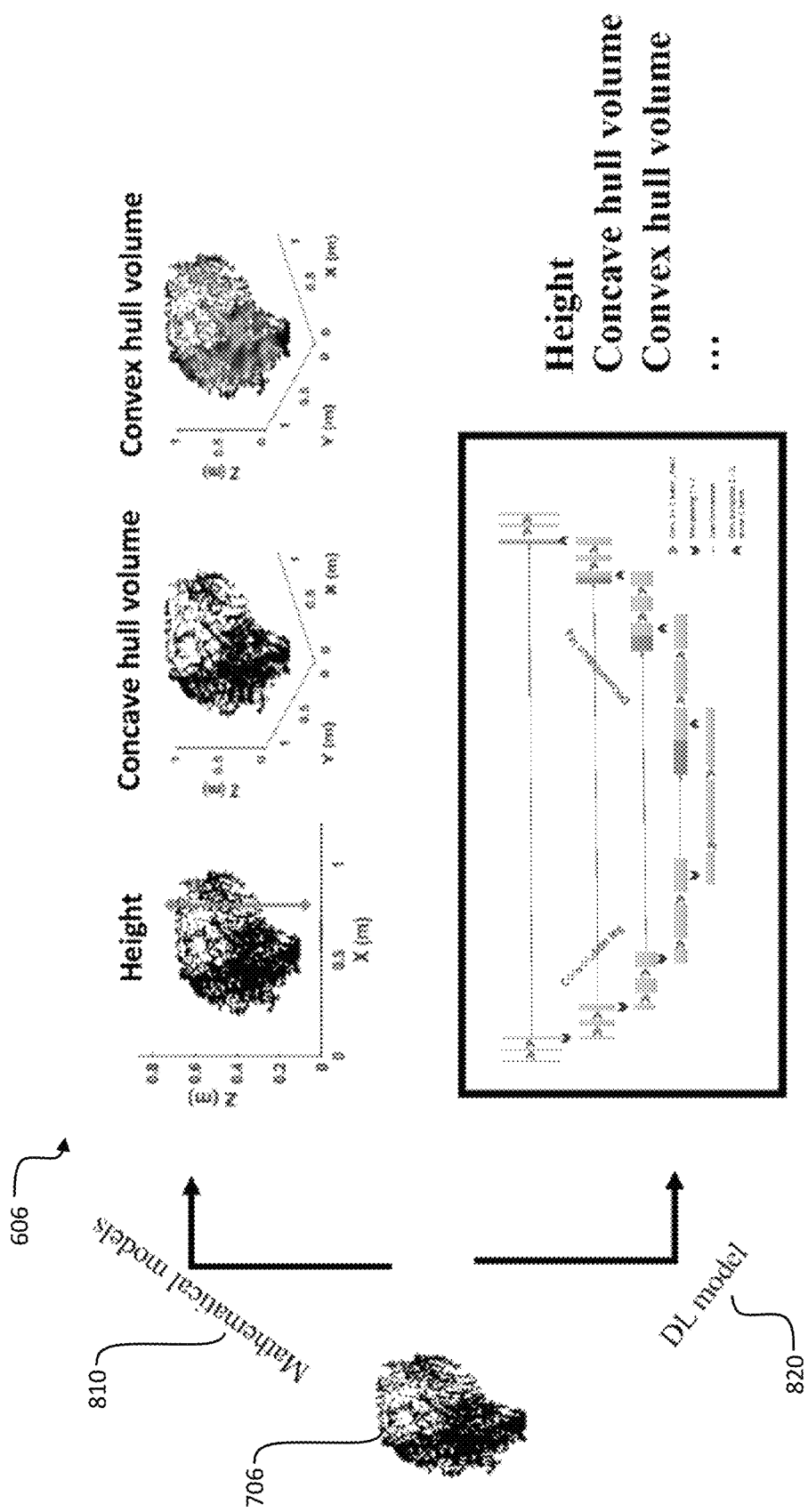
FIG. 8 shows a post-process stage of the machine learning process.

As shown particularly in FIGS. 7 and 8, the noise processed cloud data 702 may then be passed into the deep learning model 604. In this aspect, the deep learning model 604 may be a convolutional neural network based technique (CNN) 708. The model may be responsible to segment the crop data points from the rest of points. The CNN 708 may provide improved computational performance for extracting one or more features from the noise-processed point cloud data 702. The CNN 708 may provide improved extraction of one or more irregular and/or unordered features not typically encountered when processing data represented in dense grids.

The CNN 708 may comprise X-convolution layers, which may simultaneously weigh and permute one or more transformed features of the noise-reduced point cloud data 702 before applying a convolution to the transformed features. The input to the CNN 708 may be filtered and color registered point cloud data and the output may be segmented point cloud data. In this aspect, the CNN may be a Point-CNN based model. The CNN 708 may consider one or more point shapes while being invariant to order to perform one or more classifications and/or one or more segmentations of the noise-reduced point cloud data 702 to produce a feature extracted point cloud data 704. The CNN 708 may outperform other models, such as PointNet++, which is designed specifically for point clouds.

A plurality of crop yield data may be calculated for the entire field using the feature extracted point cloud data 704. According to some aspects, the CNN 708 may comprise a segmentation model 513 for separating and/or associating a set of points with an identified crop plant 706.

As shown particularly in FIGS. 7 and 8, one or more of the identified crop plants 706 may be processed at the post processing stage 606 using mathematical models 810 and/or an additional deep learning model 820. The mathematical models 810 may calculate one or more plant characteristics for each of the identified crop plants 706, such as a height, a concave hull volume, a convex hull volume, a leaf area index, bush size, bush height, etc. For example, the mathematical models 810 may comprise a comparison of the plant height to a maximum height and a minimum height for each particular crop type. In other examples, the concave and/or convex hull volume may be related to a mathematical model for each particular crop type. Similarly, the additional deep learning model 820 may predict the plant characteristics for each of the identified crop plants 706. The calculated plant characteristics may be compared to the predicted plant characteristics to train and/or refine the predicted plant characteristics.

The post processing unit 820 may provide quantitative measurements of one or more biophysical variables that are not possible to detect directly using satellite remote sensing, such as LAI, plant height, etc.

The predicted plant characteristics as well as data collected by the weather sensor 520, the soil moisture sensor 521, the temperature/humidity/pressure sensor 524, and/or satellite remote sensing data 526 may be used in the yield predictor ML model 514 to improve accuracy of the crop yield data.

Figure 10:
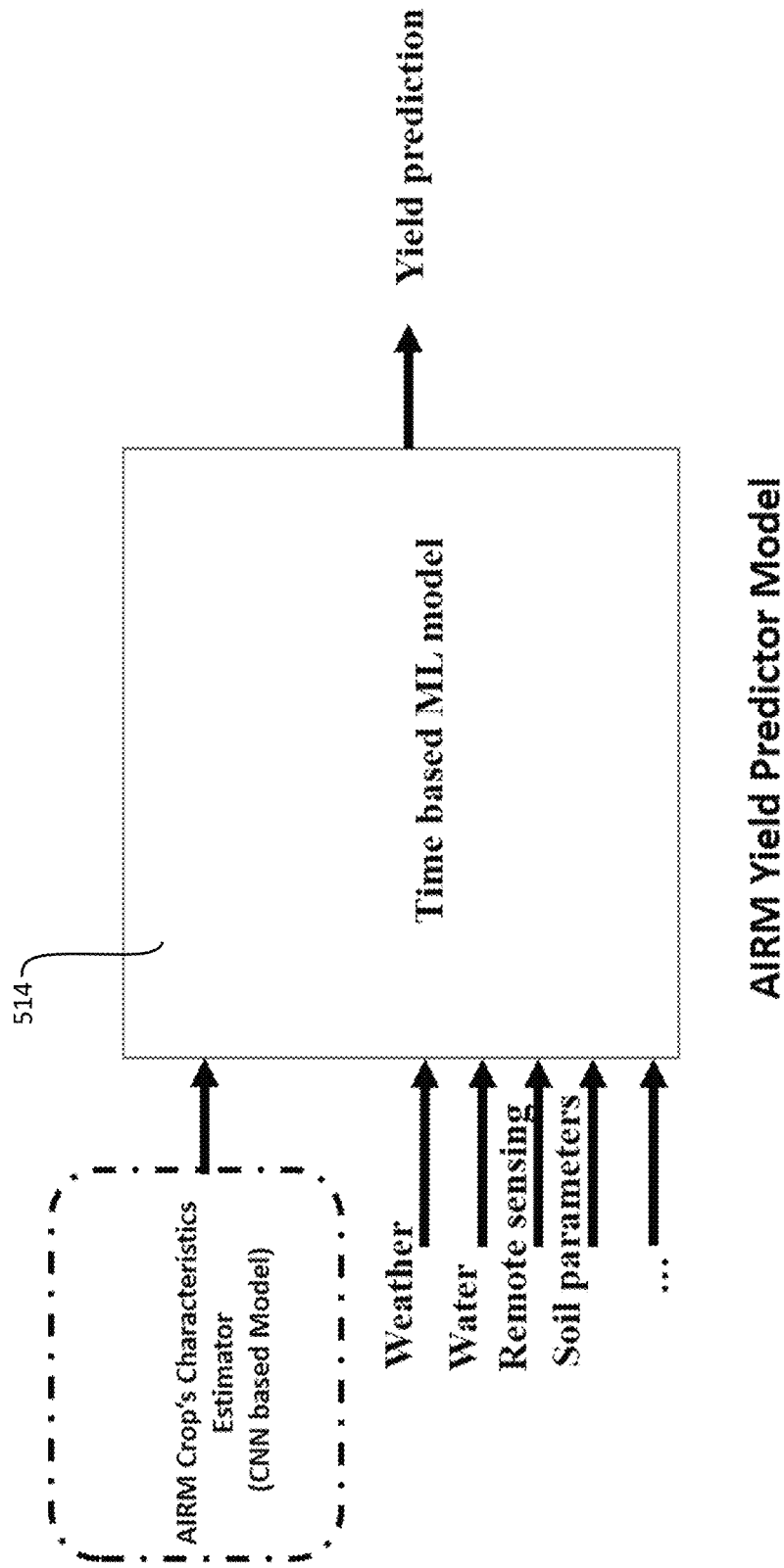
FIG. 10 is a block diagram of a yield predictor model process.

As shown particularly in FIG. 10, the yield predictor ML model 514 may be a time based machine learning model 514 may retrieve the combined data from the last part to predict the yield.

A transmission process 514 may send the crop yield data to the host server 324.

Periodically, the controller 319 may execute an end-of-season process 516 to determine if the growing season has ended. The end-of-season may be determined by a particular date entered into the controller 319. The date may be determined by the farmer or may be determined based on one or more of the following: weather reports, detection of the crop being harvested, etc. If the end-of-season has been detected, the controller 319 may perform a season shutdown process 517 where all subsystems are deactivated except for the self-diagnostic process 503 in order to ensure that the battery 303 stays fully charged and the BMS follows the manufacturer's recommendation for operation in extreme cold conditions to protect the battery 303. If the end-of-season has not been detected, a self-diagnostic data collection process 518 may be performed and a generic reporting process 519 may be executed. The controller 319 may then put the field monitor 300 to sleep until the next measurement period.

A method for an autonomous and remote monitoring system in a field that predicts annual crop yield.

Although the aspect described herein suggests powering using the solar panel, other aspect may provide a wind turbine or a combination of the two power sources.

Various components, subcomponents and parts can be used to achieve, implement and practice the processes, computations, techniques, steps, means and purposes described herein. The embodiments and inventions contained herein may be practiced in various forms and approaches as selected by one skilled in the art. For example, these processes, computations, techniques, steps, means and purposes described herein may be achieved and implemented in hardware, software, firmware or a combination thereof. The computing components and processes described herein can be distributed across a fixed or mobile network or both at the same time or different times. For example, some processing may be performed in one location using a first processor while other processing may be performed by another processor remote from the first processor. Other components of computer system may be similarly distributed. As such, computer system may be interpreted as a distributed computing system that performs processing in multiple locations. In some instances, computer system may be interpreted as a single computing device.

One skilled in the art may choose hardware implementations for the processing units using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

One skilled in the art may choose implementations including hardware, software, scripting languages, firmware, middleware, microcode, hardware description languages, and/or any combination thereof. Software, firmware, middleware, scripting language, and/or microcode implementations may have the program code or code segments to perform the necessary tasks stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

One skilled in the art may choose implementations including firmware and/or software utilizing modules (e.g., procedures, functions, algorithms, etc.) that perform the processes described herein. Any machine-readable medium tangibly embodying instructions may be used in implementing the processes and methodologies and techniques described herein. For example, software codes may be stored in a memory. Memory may be implemented within a processor or external to a processor. "Memory" as used herein refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

The computer systems described herein may use without limitation one or more general-purpose processors and/or one or more special-purpose processors (such as digital signal processing chips, graphics acceleration processors, video decoders, and/or the like). The computer systems described herein may use and or configure storage devices to implement any appropriate data stores, including without limitation, various file systems, database structures, database control or manipulation or optimization methodologies.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A crop monitoring system for a field comprising:
   a frame;
   a battery mounted to the frame and providing electrical power;
   a Light Detection and Ranging (LiDAR) sensor mounted to the frame;
   a camera mounted to the frame;
   an enclosure mounted to the frame, the enclosure housing a processing structure; the processing structure executing a plurality of instructions stored on a tangible computer-readable memory;
   the instructions comprise:
      capturing point data from the LiDAR sensor;
      capturing image data from the camera;
      generating a 3D color-assigned cloud point data set from the image data and the point data; and
      determining crop characteristic data based on the 3D color-assigned cloud point data set.

2. The crop monitoring system according to claim 1, further comprising: a rotating platform mounted on the frame; the rotating platform supporting the LiDAR sensor and the camera; and the instructions further comprise: rotating the rotating platform before the capturing of the point data and the image data.

3. The crop monitoring system according to claim 2, wherein the instructions further comprise: determining a field of view (FOV) of the LiDAR sensor; determining a rotational measurement associated with the FOV of the LiDAR sensor; and rotating the rotating platform by the rotational measurement before the capturing of the point data.

4. The crop monitoring system according to claim 1, wherein the instructions further comprise: filtering the 3D color-assigned cloud point data set prior to determining the crop characteristic data.

5. The crop monitoring system according to claim 1, wherein the instructions further comprise: filtering the point data set prior to generating the 3D color-assigned cloud point data set.

6. The crop monitoring system according to claim 1, wherein the instructions further comprise: segmenting crop data points from the 3D color-assigned cloud point data set as part of the determining of the crop characteristic data.

7. The crop monitoring system according to claim 1, wherein the processing structure comprises a graphical processing unit (GPU).

8. The crop monitoring system according to claim 1, further comprising: a solar panel providing electrical charge to the battery.

9. The crop monitoring system according to claim 8, wherein the instructions further comprise: a battery management system placing the processing structure in a standby state when the battery management system determines that the battery falls close to 80% of full capacity.

10. The crop monitoring system according to claim 1, further comprising: at least one sensor providing at least one sensor measurement to the processing structure; and the instructions further comprise: determining at least one parameter to adjust the crop characteristic data.

11. The crop monitoring system according to claim 10, wherein the at least one sensor is selected from at least one of: a temperature sensor, a humidity sensor, a pressure sensor, a soil moisture sensor, a soil resistance sensor, a nitrogen/phosphorus/potassium (NPK) sensor, a rain gauge, and a solar radiation sensor.

12. A method for monitoring a field comprises:
capturing point data from a Light Detection and Ranging (LiDAR) sensor;
capturing image data from a camera;
generating, using a processor, a 3D color-assigned cloud point data set from the image data and the point data; and
determining, using the processor, crop characteristic data based on the 3D color-assigned cloud point data set.

13. The method of claim 12 further comprise: rotating a rotating platform supporting the LiDAR sensor and the camera before the capturing of the point data and the image data.

14. The method of claim 13 further comprise: determining a field of view (FOV) of the LiDAR sensor; determining a rotational measurement associated with the FOV of the LiDAR sensor; and rotating the rotating platform by the rotational measurement before the capturing of the point data.

15. The method of claim 12 further comprise: filtering, by the processor, the 3D color-assigned cloud point data set prior to determining the crop characteristic data.

16. The method of claim 12 further comprise: filtering, by the processor, the point data set prior to generating the 3D color-assigned cloud point data set.

17. The method of claim 12 further comprise: segmenting, by the processor, crop data points from the 3D color-assigned cloud point data set as part of the determining of the crop characteristic data.

18. The method of claim 12, wherein the processor comprises a graphical processing unit (GPU).

19. The method of claim 12 further comprise: placing the processor in a standby state when a battery management system determines that the battery falls close to 80% of full capacity.

20. The method of claim 12, further comprise: reading at least one sensor measurement from at least one sensor; and determining at least one parameter from the at least one sensor measurement to adjust the crop characteristic data.

21. The method of claim 20, wherein the at least one sensor is selected from at least one of: a temperature sensor, a humidity sensor, a pressure sensor, a soil moisture sensor, a soil resistance sensor, a nitrogen/phosphorus/potassium (NPK) sensor, a rain gauge, and a solar radiation sensor.

* * * * *